United States Patent
Katsurahira et al.

[11] Patent Number: 5,977,959
[45] Date of Patent: Nov. 2, 1999

[54] POSITION POINTING DEVICE

[75] Inventors: Yuji Katsurahira; Yasushi Sekizawa; Masayasu Yamamoto; Takenori Kaneda, all of Saitama-Ken, Japan

[73] Assignee: Wacom Co., Ltd., Saitama-ken, Japan

[21] Appl. No.: 08/917,838

[22] Filed: Aug. 27, 1997

[30] Foreign Application Priority Data

Oct. 31, 1996 [JP] Japan ................................. 8-305903

[51] Int. Cl.⁶ ............................................. G09G 5/00
[52] U.S. Cl. ...................... 345/179; 345/173; 178/19.02; 178/19.01
[58] Field of Search ................................ 345/173, 179; 178/19.01, 19.02, 19.03, 19.04, 19.05, 19.06, 19.07, 18.01, 20.02, 18.03; 382/186–189, 314; 73/862.04, 862.041

[56] References Cited

U.S. PATENT DOCUMENTS

| | | |
|---|---|---|
| Re. 35,016 | 8/1995 | Gullman et al. ................ 73/862.041 |
| 4,878,553 | 11/1989 | Yamanami et al. . |
| 4,896,543 | 1/1990 | Gullman ........................... 73/862.04 |
| 4,902,858 | 2/1990 | Yamanami et al. ............... 178/19.03 |
| 5,111,004 | 5/1992 | Gullman ........................... 178/18 |
| 5,466,896 | 11/1995 | Murakami et al. . |
| 5,565,632 | 10/1996 | Ogawa ............................. 73/862.69 |
| 5,629,500 | 5/1997 | Fukuzaki et al. ................. 178/19.07 |

*Primary Examiner*—Steven J. Saras
*Assistant Examiner*—Amr Awad
*Attorney, Agent, or Firm*—Finnegan, Henderson, Farabow, Garrett & Dunner, L.L.P.

[57] ABSTRACT

A pen shaped position pointing device used in a position detecting apparatus. A pen-tip segment has side pressure detectors to detect pressure from side directions. The side pressure detectors detect the pen pressure even when the pen is tilted with a large angle. If multiple side pressure detectors are provided, each detector can have a different function, for example, color.

13 Claims, 5 Drawing Sheets

POSITION POINTING DEVICE

BACKGROUND OF THE INVENTION

1. Field of the Invention

The present invention relates to an improvement in a position pointing device used with a tablet in a position detecting apparatus.

2. Description of the Related Art

The applicants' assignee disclosed a position pointing device in Japanese Patent Application No. 61-213970 ("the prior application"), the disclosure of which is hereby incorporated by reference. Cordless operation between the stylus and the tablet occurs based on the transmission/reception of electromagnetic waves between the pen and the tablet.

In the prior application, a pen-shaped position pointing stylus detects pen-pressure. The pen-pressure stylus detects the pressure at the tip of the stylus as a phase change of an electromagnetic wave. Especially in the computer graphics field, the pen-pressure stylus allowed a user to input a figure or drawing freely, adjusting line thickness and color depth using the pen-pressure information detected by the pen-pressure stylus.

The pen-pressure stylus disclosed in the prior application, however, cannot detect pressure toward the pen-axis from a side direction.

When a pencil is used for a drawing, it can be used in such a way that a line thickness and a degree of darkness can be varied delicately by tilting the pencil, using a side part of the pencil core, adjusting a tilt and pressure of the pencil.

There is a demand in the computer graphics to use a stylus in the same manner as a pencil.

SUMMARY OF THE INVENTION

The purpose of the present invention is to provide a pen shaped position pointing device capable of detecting pen pressure even when the pen is tilted at a large angle.

Another purpose of the present invention is to provide a position pointing device which can change an inputting color by changing the direction of the tilt of the position pointing device.

In order to accomplish the above mentioned purposes, the present invention provides a pointing device comprising a side pressure detecting means installed at a pen-tip segment to detect pressure along the pen-axis in the perpendicular direction, said side pressure detecting means comprising a pressure sensitive conductive material and an electrode; and plural pressure detecting means to detect pressure to the pen axis from plural directions installed at the pen-tip segment.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

DESCRIPTION OF THE PREFERRED EMBODIMENT

Reference will now be made in detail to the present preferred embodiments of the invention, examples of which are illustrated in the accompanying drawings.

The present invention is embodied in a position pointing device and an associated graphics tablet. The position pointing device inputs information such as graphics or a drawing by tracing on the graphics tablet. Examples of position pointing devices and graphics tablets are disclosed in U.S. Pat. No. 4,878,553 and 5,466,896, the disclosures of which are hereby incorporated by reference.

Figure 1:
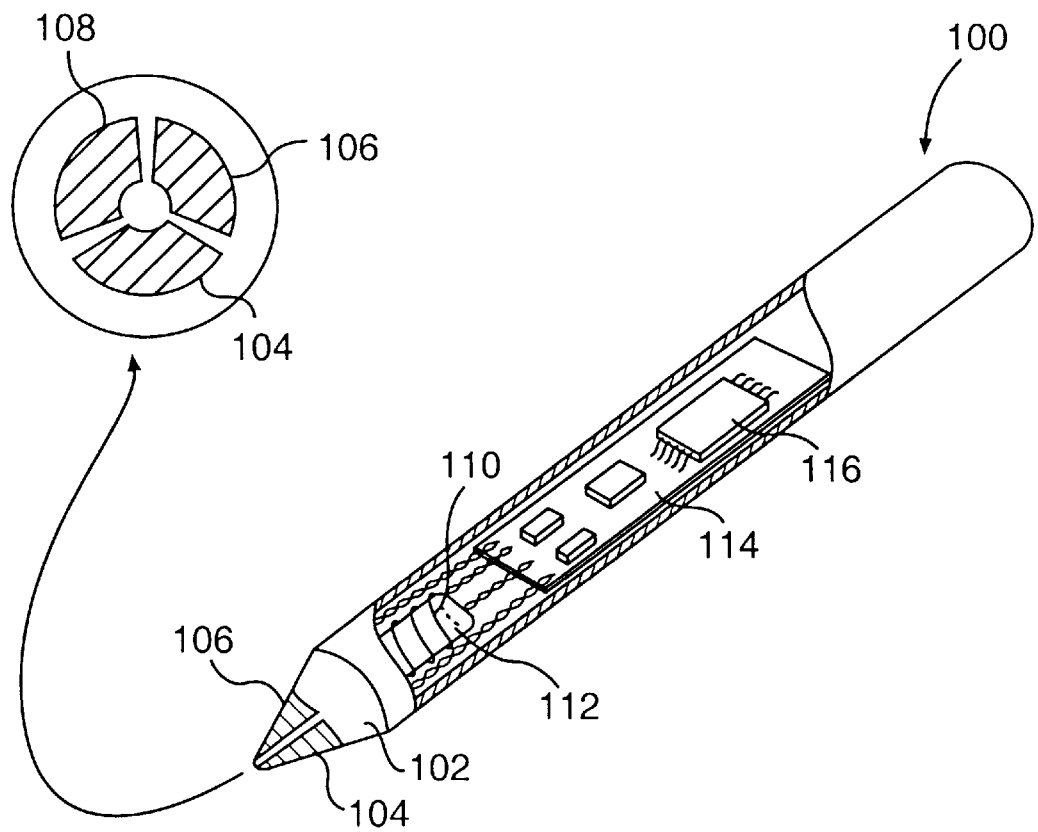
FIG. 1 illustrates a first embodiment of a position pointing device.

FIG. 1 illustrates a first embodiment of a position pointing device 100. The pen-shaped position pointing device, or stylus, 100 includes a pen-tip segment 102 at one end. Pen-tip segment 102 includes more than one pressure sensor. In this embodiment, three pressure sensors 104, 106, and 108 are mounted on the pen-tip segment 102. According to alternative embodiments of the invention, less than three or more than three pressure sensors may be mounted on the pen tip. The pressure sensors 104, 106, and 108 detect the pressure application direction and thus the tilt of the position pointing device.

A coil 110 winds around a ferrite core 112. An electronic circuit segment 114 transmits and receives information with a tablet and is installed inside the position pointing device 100. The electronic circuit segment includes integrated chips 116.

In the first embodiment, the pen-tip segment has a conical shape and three pressure sensors. The conical shape is preferred because it mimics the look, shape, and feel of a pencil. The three pressure sensors may include three different function selections such as, for example, three different colors. In this embodiment pressing pressure sensor 104 produces black; pressing pressure sensor 106 produces blue; and pressing, pressure sensor 108 produces red. Thus, the tilt of the position pointed device determines the color produced. Other numbers of pressure sensors and different shapes are also possible. For example, a flat pen-tip segment might have two pressure sensors, while a cubic shaped pen-tip segment might have four pressure sensors.

Figure 2:
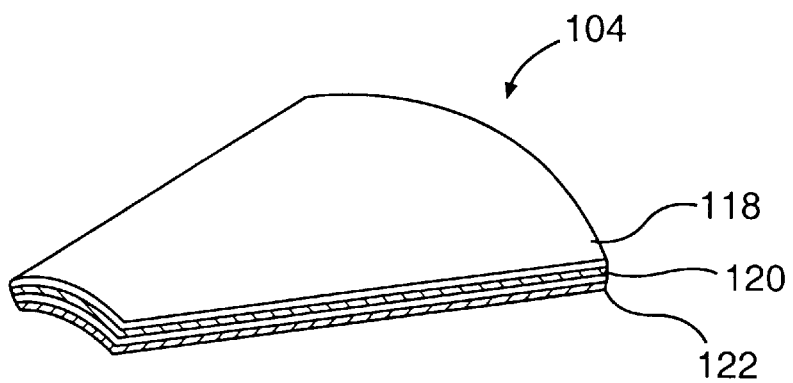
FIG. 2 shows a cross-sectional view of a pressure sensor in the position pointing device shown in FIG. 1.

FIG. 2 shows a structure of one of the pressure sensors having three layers. A pressure sensitive conductive rubber sheet 120 is between a surface sheet 118 and an electrode board 122. The surface sheet 118 is made of a material with a high abrasion resistance and presses against the tablet. The pressure sensitive conductive rubber sheet 120 has a resistance value that varies in accordance with the pressure. In the present embodiment, the pressure sensors 104, 106, and 108 indicate black, blue, and red, and the surface sheets 118 can be correspondingly colored black, blue, and red. The surface sheets 118 could be colored or otherwise marked to indicate different functions in accordance with different embodiments.

Figure 3:
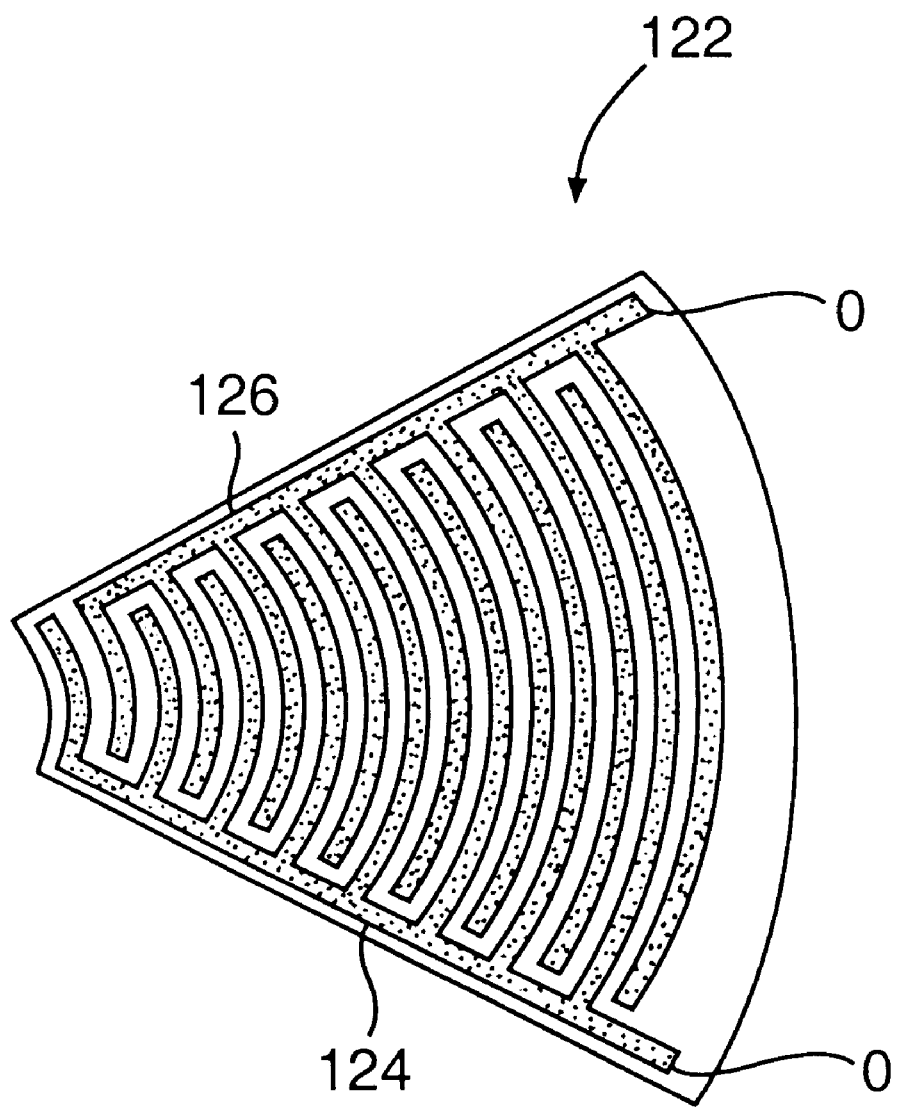
FIG. 3 illustrates an electrode pattern for the pressure sensor shown in FIG. 2.

FIG. 3 illustrates an example of an electrode pattern on the electrode board 122. Two electrodes 124 and 126 form a comb pattern. The pressure sensitive conductive rubber sheet 120 connects the electrodes 124 and 126 so that the resistance value changes in response to the load added to any part of the pressure sensor 104.

Figure 4:
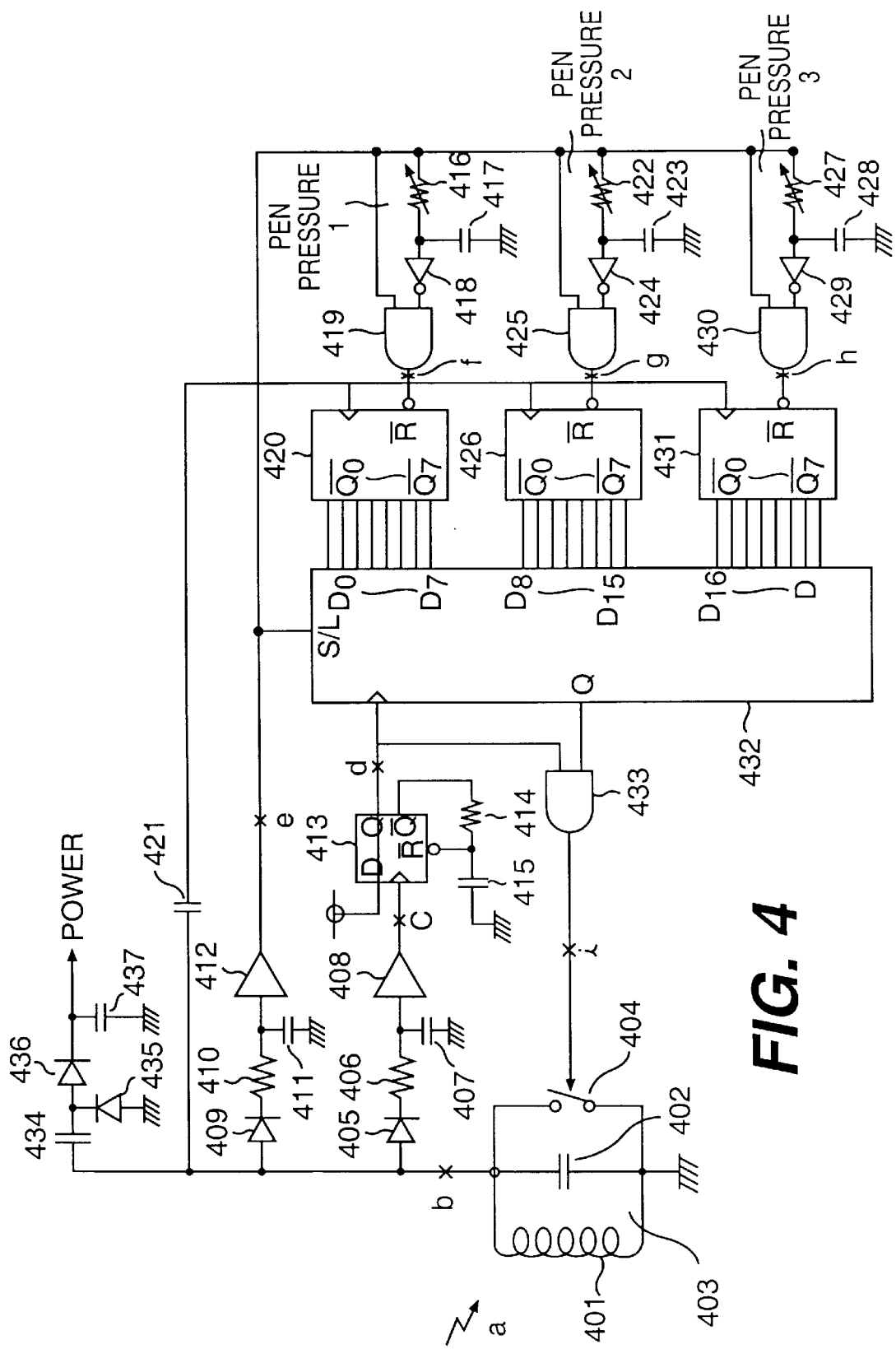
FIG. 4 shows an electronic circuit of the first embodiment.

FIG. 4 shows an electronic circuit of the position pointing device 100. Three pressure sensors are illustrated as variable resistances 416, 422, and 427 and are described as pen-pressure 1, pen-pressure 2, and pen-pressure 3. The variable resistances 416, 422, and 427 correspond to the pressure sensitive conductive rubber sheet 120 in pressure sensors 104, 106 and 108.

Figure 5:
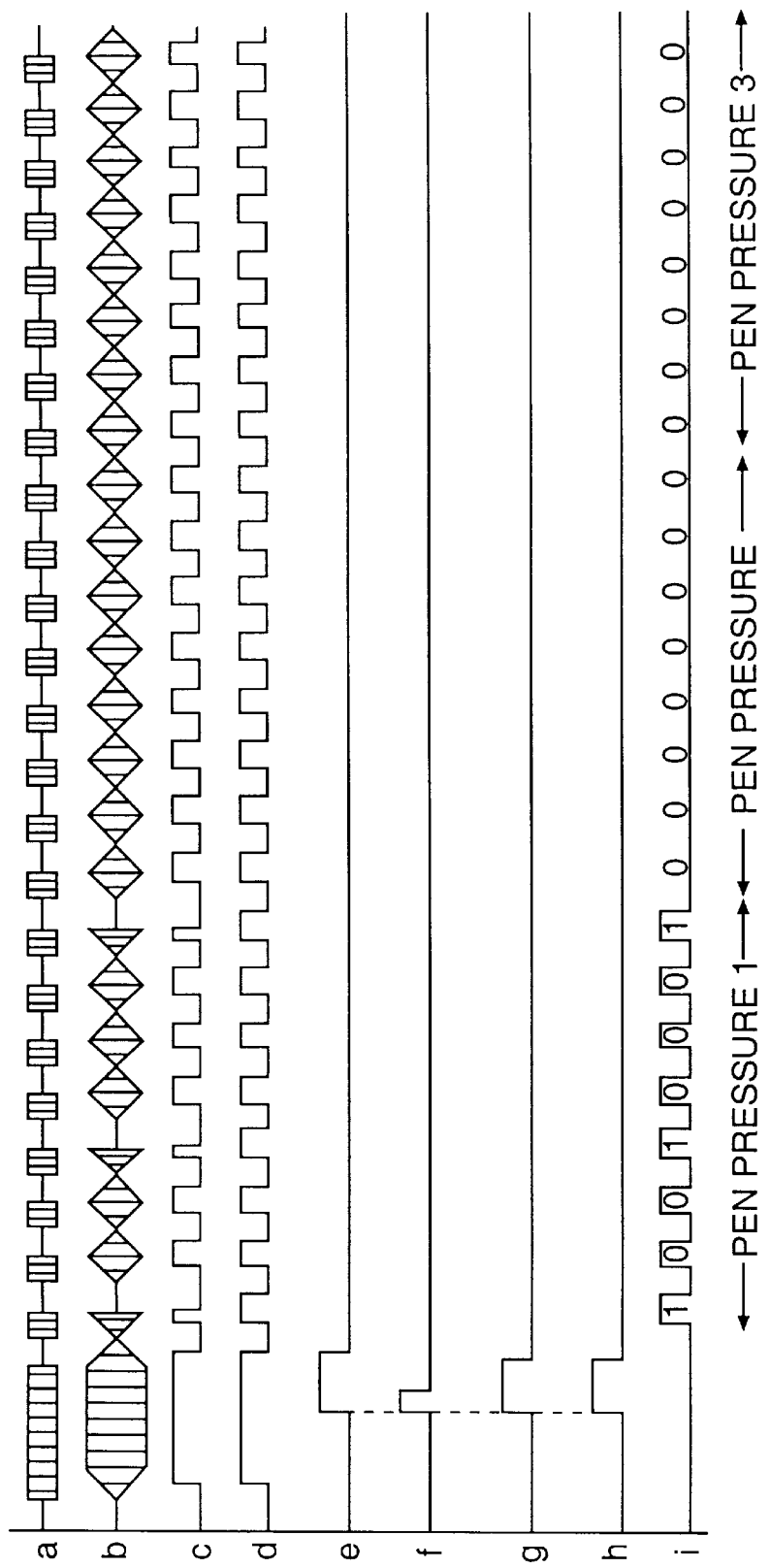
FIG. 5 is a timing diagram showing the wave forms at positions $a$–$i$ in FIG. 4.

The circuit shown in FIG. 4 transmits each pen-pressure value converted to an 8 bit digital value (all together 24 bits) to the table side. FIG. 5 shows a waveform at each segment a~i of the circuit diagram of FIG. 4. The operation will now be explained with references to these drawings.

In FIG. 4, a coil 401 and a capacitor 402 comprise a resonance circuit 403. A switch 404 is connected across the resonance circuit 403. The resonance circuit 403 resonates at the frequency of an electromagnetic wave from the tablet (not shown in the diagram), generating an induced voltage "b" upon receiving the electromagnetic wave "a" from the tablet.

A first detecting circuit is connected to the resonance circuit; the first detecting circuit comprises a diode 405, a resistance 406, a capacitor 407, and a buffer amplifier 408. In the first detecting circuit, the time constant of an integration circuit comprising the resistance 406 and the capacitor 407 is set to generate an output signal "c" when the electromagnetic wave "a" from the tablet is received continuously for longer than a first predetermined period (50 $\mu$S in the present embodiment).

A one-shot multivibrator circuit includes a D flip flop 413, a resistance 414, and a capacitor 415. The one-shot multivibrator circuit generates a signal "d" with a constant time interval from the start up time of the output signal "c" of the first detecting circuit.

A second detecting circuit includes a diode 409, a resistance 410, a capacitor 411, and a buffer amplifier 412. The second detector circuit is also connected to the resonance circuit 403. In the second detecting circuit, the resistance 410 and the capacitor 411 form an integration circuit. The time constant of the integration circuit is set to generate an output signal "e" when the electromagnetic wave "a" from the tablet is continuously received for longer than a second predetermined period (700 $\mu$S in the present embodiment).

In FIG. 4, the variable resistance 416 (the first pressure sensor), a capacitor 417, an inverter amplifier 418, and an AND gate 419 form a circuit. This circuit generates a signal "f" whose pulse width changes in accordance with the pen-pressure 1 set by the variable resistance 416. In other words, the larger the added pressure is, the smaller the pulse width of the signal "f" becomes.

A coupling capacitor 421 connects a clock terminal of a counter 420 to the resonance circuit 403. The counter 420 receives the signal "f". The counter 420 counts the number of high frequency waves generated in the resonance circuit 403 during the period of the pulse width of the signal "f" which changes in accordance with the pen-pressure 1, and outputs digital values Q0~Q7.

The counter 420 is a subtracting counter, i.e., at the reset mode (when the signal "f" is low level) the output is all "1". Each time a clock plus occurs, the output decreases by 1. After the clock is plused 256 times and the output becomes "0", further clock inputs will not be accepted.

The counter 420 thus outputs all "0" when a load is not added, and as an added load increases the output becomes a larger value. When a load is above certain value then the output Q1~Q7 becomes all "1".

The variable resistance 422 (the second pressure sensor,) a capacitor 423, an inverter amplifier 424, and an AND gate 425 form another circuit. This circuit outputs a signal "g" whose pulse width changes in accordance with the pen-pressure 2 set by the variable resistance 422.

The counter 426 is the same as the counter 420, and the coupling capacitor 421 connects the clock terminal of the counter 426 to the resonance circuit 403. The counter 426 receives the signal "g". The counter 426 counts the number of high frequency signal waves generated in the resonance circuit 403 during the period equivalent to the pulse width of the signal "g" which changes in accordance with the pen-pressure 2, and outputs an 8 bit digital value Q0~Q7.

The variable resistance 427 (the third pressure sensor), a capacitor 428, an inverter amplifier 429, and an AND gate 430 also form a circuit. This circuit outputs a signal "h" whose pulse width changes in accordance with the pen-pressure 3 set by the variable resistance 427.

The counter 431 is the same as the counter 420, and the coupling capacitor 421 connects the clock terminal of the counter 431 to the resonance circuit 403. The counter 431 receives the signal "h". The counter 431 counts the number of the high frequency signal waves generated in the resonance circuit 403 during the period equivalent to the pulse width of the signal "h" which changes corresponding to the pen-pressure 3, and outputs an 8 bit digital value Q0~Q7.

The clock input terminal of the parallel-serial conversion circuit 432 receives the output signal "d" of the one-shot multivibrator circuit. The parallel-serial conversion circuit 432 sequentially generates: digitized 8 bit data of the pen-pressure 1 outputted from the counter 420; digitized 8 bit data of the pen-pressure 2 outputted from the counter 426; and digitized 8 bit data of the pen-pressure 3 outputted from the counter 431. The parallel-serial conversion circuit 432 then outputs 24 bit (8+8+8) digital data at each start up period of the signal "d".

This output signal, by going through an AND gate 433, causes the signal "i" to be attained only while the signal "d" is generated. The signal "i" controls the opening and closing of the switch 404. The tablet then receives: the pen pressure 1 digitized to 8 bit data, the pen pressure 2 digitized to 8 bit data, and the pen pressure 3 digitized to 8 bit data. This data comprises, together, 24 bit digital data that carries information regarding the existence or nonexistence of the reception signal.

When the control signal "i" is "0", the signal will be detected by the tablet side, and when the control signal "i" is "1" then the signal will not be detected by the tablet side. In this way, a load applied to the three pressure sensors equipped for the position pointing device will be detected by the tablet side.

Figure 6:
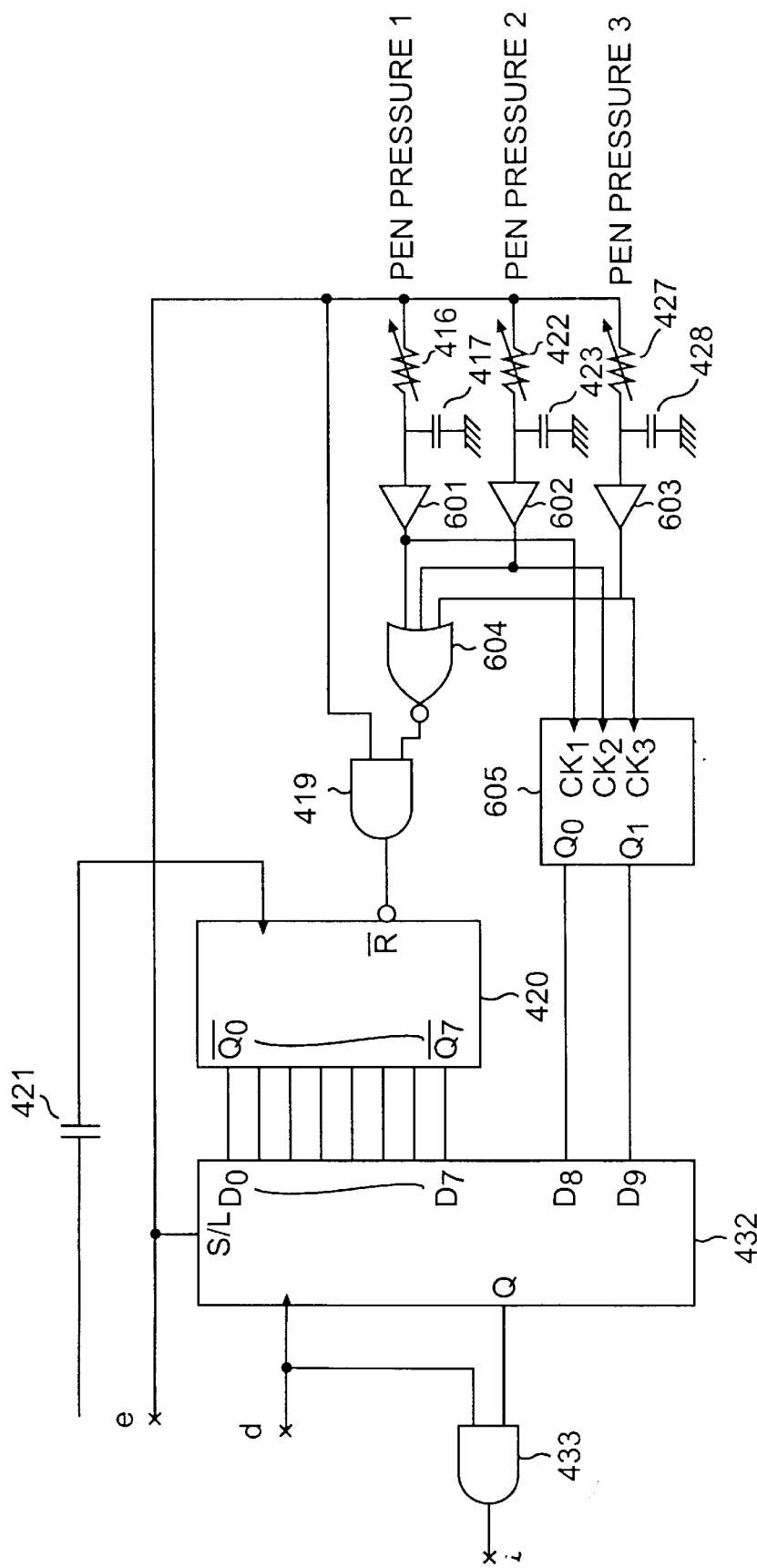
FIG. 6 illustrates a circuit diagram of a pen-pressure detecting segment in accordance with a second embodiment of the position pointing device.

FIG. 6 illustrates a circuit diagram of a pen-pressure detecting segment in accordance with a second embodiment of the position pointing device. The second embodiment is similar to the first embodiment except for the circuit of the pen-pressure detecting segment. In the first embodiment, the load applied to the three pressure sensor is respectively digitized and altogether 24 bit data is returned. In the second embodiment, only the sensor that detects the largest load returns the converted digital data.

In FIG. 6, the same parts are shown by the same number as shown in FIG. 4. A signal whose start up time changes corresponding to the pen-pressure 1 is attained by the first pressure sensor 416, the capacitor 417, and the buffer amplifier 601. Another signal whose start up signal changes corresponding to the pen-pressure 2 is attained by the second pressure sensor 422, the capacitor 423, and the buffer amplifier 602. Yet another signal whose start up time changes corresponding to the pen-pressure 3 is attained by the third pressure sensor 427, the capacitor 428, and the buffer amplifier 603. A NOR gate 604 detects the output of the detecting circuit with the fastest start up timing. Through this configuration, the timing equivalent to the largest load applied to the three pressure sensors is outputted, and the output is converted to an 8 bit digital value by the counter 420.

The encoder 605 detects which of the three clock inputs CK1~CK3 starts up the fastest and outputs as Q0, Q1. This two bit output signal is inputted to the parallel-serial conversion circuit 432, and the tablet side a signal receives to identify which of the three pressure sensors received the highest load.

In the above described embodiments the configuration detects only the side pressure added to the pen-tip segment. It is acceptable to add a pressure sensor to detect a pressure in the direction of the pen axis as employed in the prior art, and combine it with the present invention.

The present invention, by installing the side pressure detecting means at the pen-tip segment to detect the pressure perpendicular to the pen axis, allows a pen pressure detection even when a pen is tilted with a large angle. Further, installing the plural side pressure detecting means to detect the pressure from different directions allows tilt direction and allows using tilt to indicated an application. Such and application includes changing color and might also include line width, brightness, or texture.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A pen shaped position pointing device used in a position detecting apparatus, comprising;
   a housing having an axis and a pen-tip segment at one end, the pen-tip segment of the housing having a working tip, the working tip being integral with the housing; and
   a side pressure detecting means at the pen-tip segment for detecting pressure on the working tip in a first direction perpendicular to the axis.

2. The position pointing device as claimed in claim 1, wherein the pressure sensor comprises: a first electrode, a second electrode, and a pressure sensitive conductive material connecting the first and second electrodes.

3. The position pointed device as claimed in claim 2, further comprising a second side pressure detecting means at the pen-tip segment for detecting pressure in a second direction perpendicular to the pen axis, the second direction being different from the first direction.

4. The position pointed device as claimed in claim 1, further comprising a second side pressure detecting means at the pen-tip segment for detecting pressure in a second direction perpendicular to the pen axis, the second direction being different from the first direction.

5. A pen shaped position pointing device used in a position detecting apparatus, comprising:
   a housing having an axis and a pen-tip segment at one end, the pen-tip segment of the housing having a working tip, the working tip being integral with the housing;
   a first pressure sensor on the pen-tip segment; and
   a second pressure sensor on the pen-tip segment, the second pressure sensor being positioned so as to detect pressure on the working tip applied from a different direction than the first pressure sensor.

6. The position pointing device as claimed in claim 5, wherein the pen-tip segment has a conical shape.

7. The position pointing device as claimed in claim 5, wherein each pressure sensor comprises: a first electrode, a second electrode, and a pressure sensitive conductive material connecting the first and second electrodes.

8. The position pointing device as claimed in claim 7, wherein the pressure sensitive conductive material has an electrical resistance that varies according to the pressure applied.

9. The position pointing device as claimed in claim 5, wherein the first and second pressure sensors are positioned so as to sense pressure applied perpendicular to the axis.

10. The position pointing device as claimed in claim 9, further comprising a third pressure sensor on the pen-tip segment, the third pressure sensor being positioned so as to detect pressure applied perpendicular to the axis.

11. The position pointing device as claimed in claim 10, further comprising a fourth pressure sensor on the pen-tip segment, the fourth pressure sensor being positioned so as to detect pressure applied perpendicular to the axis.

12. The position pointing device as claimed in claim 11, further comprising a fifth pressure sensor on the pen-tip segment, the fifth pressure sensor being positioned so as to detect pressure applied perpendicular to the axis.

13. A pen shaped position pointing device used in a position detecting apparatus, comprising:
   a housing having an axis and a pen-tip segment at one end;
   a first pressure sensor in the pen-tip segment; and
   a second pressure sensor on the pen-tip segment, the second pressure sensor being positioned so as to detect pressure applied from a different direction than the first pressure sensor,
   wherein the pen-tip segment has a conical shape and the first pressure sensor indicates one color and the second pressure sensor indicates another color.

* * * * *